US011273864B2

(12) United States Patent
Matsuo et al.

(10) Patent No.: US 11,273,864 B2
(45) Date of Patent: Mar. 15, 2022

(54) STEERING CONTROL DEVICE

(71) Applicant: JTEKT CORPORATION, Osaka (JP)

(72) Inventors: Shigeto Matsuo, Kako-gun (JP); Terutaka Tamaizumi, Okazaki (JP); Akihiko Nishimura, Okazaki (JP)

(73) Assignee: JTEKT CORPORATION, Osaka (JP)

( * ) Notice: Subject to any disclaimer, the term of this patent is extended or adjusted under 35 U.S.C. 154(b) by 0 days.

(21) Appl. No.: 16/758,101

(22) PCT Filed: Oct. 23, 2018

(86) PCT No.: PCT/JP2018/039337
§ 371 (c)(1),
(2) Date: Apr. 22, 2020

(87) PCT Pub. No.: WO2019/087866
PCT Pub. Date: May 9, 2019

(65) Prior Publication Data
US 2020/0331523 A1 Oct. 22, 2020

(30) Foreign Application Priority Data
Nov. 2, 2017 (JP) .............................. JP2017-213030

(51) Int. Cl.
*B62D 6/00* (2006.01)
*B62D 5/04* (2006.01)
(Continued)

(52) U.S. Cl.
CPC ........... *B62D 6/008* (2013.01); *B62D 5/0424* (2013.01); *B62D 5/0463* (2013.01);
(Continued)

(58) Field of Classification Search
CPC ........ B62D 6/008; B62D 15/021; B62D 6/08; B62D 5/0481; B62D 5/0463; B62D 5/0424
See application file for complete search history.

(56) References Cited

U.S. PATENT DOCUMENTS

| 2006/0086560 A1 | 4/2006 | Furusho et al. |
| 2009/0026003 A1 | 1/2009 | Kato et al. |
| (Continued) | | |

FOREIGN PATENT DOCUMENTS

| JP | 2004-203089 A | 7/2004 |
| JP | 2014-223832 A | 12/2014 |
| JP | 2015-042527 A | 3/2015 |

OTHER PUBLICATIONS

Jan. 8, 2019 Search Report issued in International Patent Application No. PCT/JP2018/039336.
(Continued)

*Primary Examiner* — Mathew Franklin Gordon
(74) *Attorney, Agent, or Firm* — Oliff PLC

(57) ABSTRACT

A driving assistance control device outputs a driving assistance command value to a steering control device as information indicating a target course that is generated on the basis of the detection result of a vehicle-mounted sensor. The driving assistance command value is output as a torque component or an angle component depending on the design of the driving assistance control device. In response, processing in which a driving assistance command value input from the exterior of the steering control device is used as input for angle control processing or input for torque control processing within an assist command value calculation unit is performed by a microcomputer as assistance command value input processing by an assistance command value input processing unit.

6 Claims, 7 Drawing Sheets

(51) Int. Cl.
*B62D 15/02* (2006.01)
*B62D 6/08* (2006.01)
(52) U.S. Cl.
CPC ............ *B62D 5/0481* (2013.01); *B62D 6/08* (2013.01); *B62D 15/021* (2013.01)

(56) References Cited

U.S. PATENT DOCUMENTS

| | | |
|---|---|---|
| 2014/0081524 A1 | 3/2014 | Tamaizumi et al. |
| 2014/0343794 A1* | 11/2014 | Tamaizumi .......... B62D 5/0472 701/42 |
| 2015/0057889 A1 | 2/2015 | Tamaizumi et al. |
| 2015/0329140 A1 | 11/2015 | Tamaizumi |
| 2016/0244092 A1 | 8/2016 | Matsuo |
| 2017/0066476 A1* | 3/2017 | Kudo ................... B62D 5/0463 |
| 2017/0253265 A1 | 9/2017 | Nishimura |
| 2018/0111642 A1* | 4/2018 | Endo ...................... B62D 6/008 |

OTHER PUBLICATIONS

U.S. Appl. No. 16/758,086, filed Apr. 22, 2020 in the name of Matsuo et al.
U.S. Appl. No. 16/757,998 filed Apr. 21, 2020 in the name of Matsuo et al.
Jan. 8, 2019 Search Report issued in International Patent Application No. PCT/JP2018/039337.
Jan. 8, 2019 Search Report issued in International Patent Application No. PCT/JP2018/039335.
Aug. 10, 2021 Search Report issued in European Patent Application No. 18873724.1.

* cited by examiner (a)

(b)

(c)

(d)

STEERING CONTROL DEVICE

TECHNICAL FIELD

The present invention relates to a steering control device.

BACKGROUND ART

The following Patent Document 1 describes an example of a steering control device that uses a steering torque by a driver to execute control that generates, with a motor, an assist torque that assists steering.

PRIOR ART DOCUMENTS

Patent Documents

Patent Document 1: Japanese Laid-Open Patent Publication No. 2004-203089

SUMMARY OF THE INVENTION

Problems that the Invention is to Solve

Recently, consideration has been given to the establishment of a driving support device that supports driving by the driver, such as an advanced driver assistance system (ADAS). Thus, it is desired that the function of the steering control device be extended to the driving support device.

Means for Solving the Problem

1. A steering control device including processing circuitry that executes a process that controls driving of a motor using an input from outside to operate a steering mechanism such that a steerable wheel of a vehicle steers, the motor being a generation source of force applied to the steering mechanism. The input includes a steering torque that is input by a driver and a driving support command value that is used to support driving by the driver, the processing circuitry executes an angle command value calculation process that calculates, using the steering torque, an angle command value corresponding to a target value of a rotation angle of a rotary shaft convertible into a steerable angle of the steerable wheel, an angle feedback control process that calculates an operation amount used to execute a feedback control for the rotation angle so that the rotation angle follows the angle command value, a control signal generation process that generates, using the operation amount, a motor control signal necessary for driving the motor, and a support command value input process that inputs the driving support command value to an upstream side of the angle feedback control process.

In the above-described configuration, the support command value input process is executed to input the driving support command value. This allows a final motor control signal to be changed from that when there is no input of the driving support command value. In this configuration, the control reflecting the driving support command value can be executed. This allows the function of the steering control device to the driving support device.

2. In the steering control device according to item 1, the operation amount includes a dimension of torque, and the driving support command value includes a dimension of torque.

The output of the angle feedback process, which is the above-described operation amount, and the driving support command value both include the dimension of torque. However, in the support command value input process, instead of correcting the output of the angle feedback process using the driving support command value, the driving support command value is input to the upstream side of the output of the angle feedback process.

3. In the steering control device according to item 2, the processing circuitry executes a torque control process, the torque control process includes a torque feedback control process that calculates a feedback torque component corresponding to an operation amount used to execute a feedback control for the steering torque so that the steering torque follows a torque command value corresponding to a target value of the steering torque that should be input by the driver and a torque command value calculation process that calculates the torque command value using a sum of the feedback torque component and the steering torque, a value corresponding to the feedback torque component being output as an input to the angle command value calculation process, and the support command value process is a process that sets the driving support command value as an input to the torque control process.

4. In the steering control device according to item 1, the driving support command value is a command value of an angle used to change a traveling direction of the vehicle, and the support command value input process is a process that adds the driving support command value to an output from the angle command value calculation process serving as an input to the angle feedback control process.

5. In the steering control device according to item 1, the driving support command value is a command value of an angle used to change a traveling direction of the vehicle, and the support command value input process is a process that subtracts the driving support command value from the rotation angle serving as an input to the angle feedback control process.

In the above-described configuration, when the driving support command value is subtracted from the rotation angle serving as a calculation parameter that functions as an input to the angle feedback control process, the angle feedback control process is executed to control the rotation angle to an angle that deviates by an amount corresponding to the driving support command value from the angle command value. Thus, in the above-described configuration, the driving support command value is used to change the traveling direction.

6. In the steering control device according to item 1, the angle command value calculation process includes a spring characteristic control calculation process that calculates, using the angle command value, a spring component having an absolute value that is larger when an absolute value of the angle command value is large than when the absolute value of the angle command value is small, the spring component being an amount that resists force of the motor that steers the steerable wheel, and a process that calculates the angle command value using a value obtained by subtracting the spring component from the input to the angle command value calculation process, the driving support command value is a command value of an angle used to change a traveling direction of the vehicle, and the support command value input process is a process that subtracts the driving support command value from the angle command value serving as an input parameter to the spring characteristic control calculation process.

In the above-described configuration, the angle command value is calculated in correspondence with a spring component. Thus, when the driving support command value is subtracted from the angle command value serving as an input parameter to the spring characteristic control calculation process, the angle command value calculated using the spring component differs from that when the driving support command value is not subtracted. Accordingly, in the above-described configuration, the traveling direction of the vehicle can be changed by subtracting the driving support command value from the angle command value as an input parameter to the spring characteristic control calculation process, as compared with when the driving support command value is not subtracted.

Effects of the Invention

In the present invention, the function of the steering control device can be extended to the driving support device.

MODES FOR CARRYING OUT THE INVENTION

A steering control device according to an embodiment will now be described below.

Figure 1:
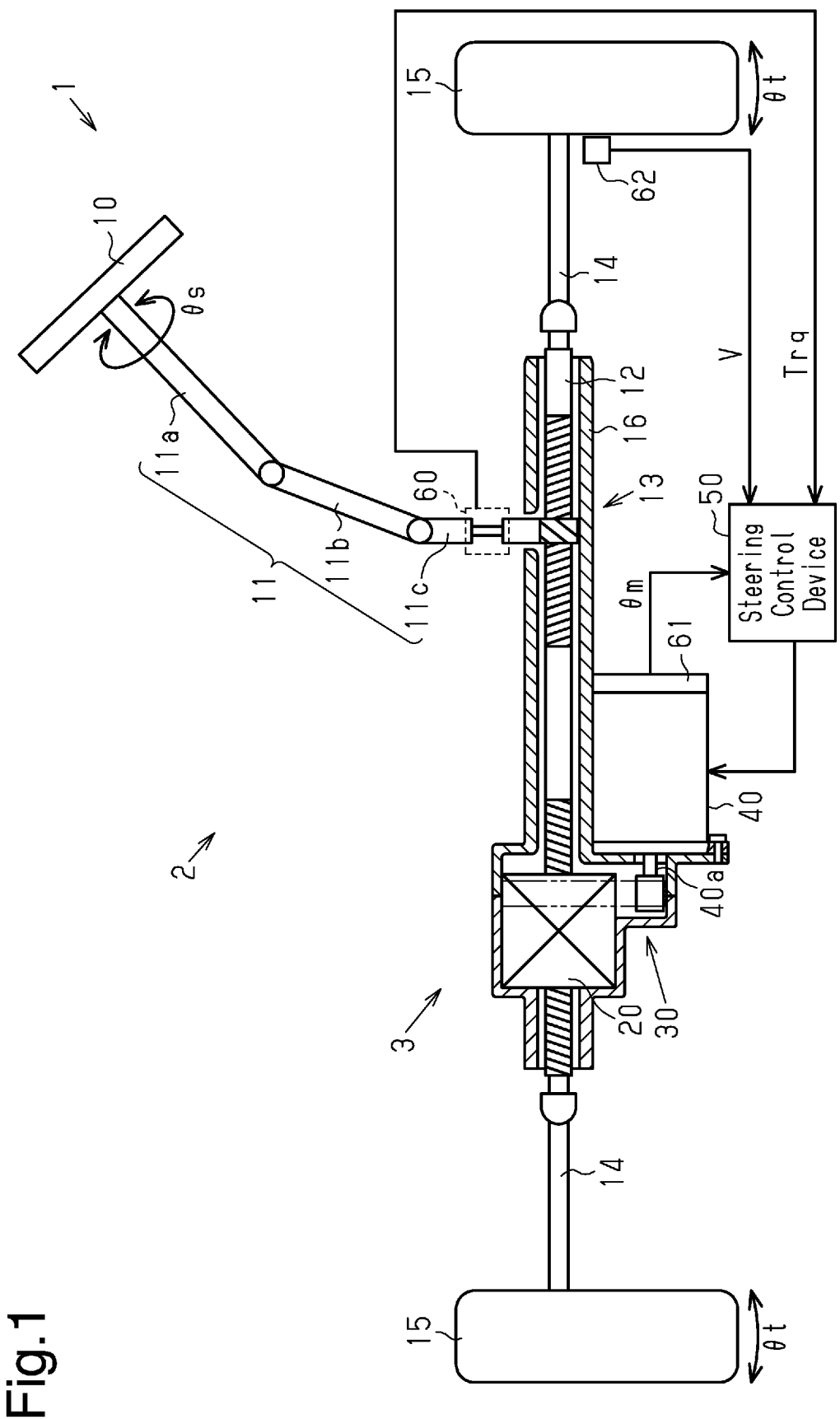
FIG. 1 is a diagram schematically showing an electric power steering.

As shown in FIG. 1, an electric power steering 1 includes a steering mechanism 2 and an assist mechanism 3. The steering mechanism 2 steers steerable wheels 15 through the operation of a steering wheel 10 by a driver. The assist mechanism 3 assists steering operation by the driver.

The steering mechanism 2 includes the steering wheel 10 and a steering shaft 11 fixed to the steering wheel 10. The steering shaft 11 includes a column shaft 11a, which is coupled to the steering wheel 10, an intermediate shaft 11b, which is coupled to the lower end of the column shaft 11a, and a pinion shaft 11c, which is coupled to the lower end of the intermediate shaft 11b. The lower end of the pinion shaft 11c is coupled to a rack shaft 12, which is a steerable shaft, by a rack-and-pinion mechanism 13. The rack shaft 12 is supported by a rack housing 16. The left and right steerable wheels 15 are respectively coupled to the opposite ends of the rack shaft 12 by a tie rod 14. Thus, rotation of the steering wheel 10, that is, rotation of the steering shaft 11, is converted into reciprocation of the rack shaft 12 in the axial direction (sideward direction in FIG. 1) by the rack-and-pinion mechanism 13, which includes the pinion shaft 11c and the rack shaft 12. The reciprocation is transmitted to the steerable wheels 15 through the tie rod 14, which is coupled to the opposite ends of the rack shaft 12. This changes steerable angles θt of the steerable wheels 15.

A motor 40 is arranged around the rack shaft 12 as an element of the assist mechanism 3. The motor 40 is a generation source of power (assist force) applied to the steering mechanism 2. The motor 40 is, for example, a three-phase (U, V, and W) brushless motor that is rotated by the drive power of the three phases. The motor 40 is coupled to the rack housing 16 from the outside of the rack housing 16. Further, the rack housing 16 internally includes, as elements of the assist mechanism 3, a ball screw mechanism 20 and a belt reduction drive 30. The ball screw mechanism 20 is arranged around the rack shaft 12 and coupled to the rack shaft 12. The belt reduction drive 30 transmits a rotation force of an output shaft 40a of the motor 40 to the ball screw mechanism 20. The rotation force of the output shaft 40a of the motor 40 is converted by the belt reduction drive 30 and the ball screw mechanism 20 into force that reciprocates the rack shaft 12 in the axial direction. The axial force applied to the rack shaft 12 serves as the power (assist force) that changes the steerable angles θt of the steerable wheels 15.

As shown in FIG. 1, a steering control device 50 that controls the driving of the motor 40 is connected to the motor 40. The steering control device 50 uses the detection results of various types of sensors to control the supply of current, which is a control amount of the motor 40, thereby controlling the driving of the motor 40. The various types of sensors include, for example, a torque sensor 60, a rotation angle sensor 61, and a vehicle speed sensor 62. The torque sensor 60 is arranged in the pinion shaft 11c. The rotation angle sensor 61 is arranged in the motor 40. The torque sensor 60 detects a steering torque Trq. The steering torque Trq is an operation state amount that occurs with a change in the steering shaft 11 caused by the operation of steering by the driver. The rotation angle sensor 61 detects a rotation angle θm of the output shaft 40a of the motor 40. The vehicle speed sensor 62 detects a vehicle speed value V, which is the travel speed of the vehicle.

The electric configuration of the electric power steering 1 will now be described.

Figure 2:
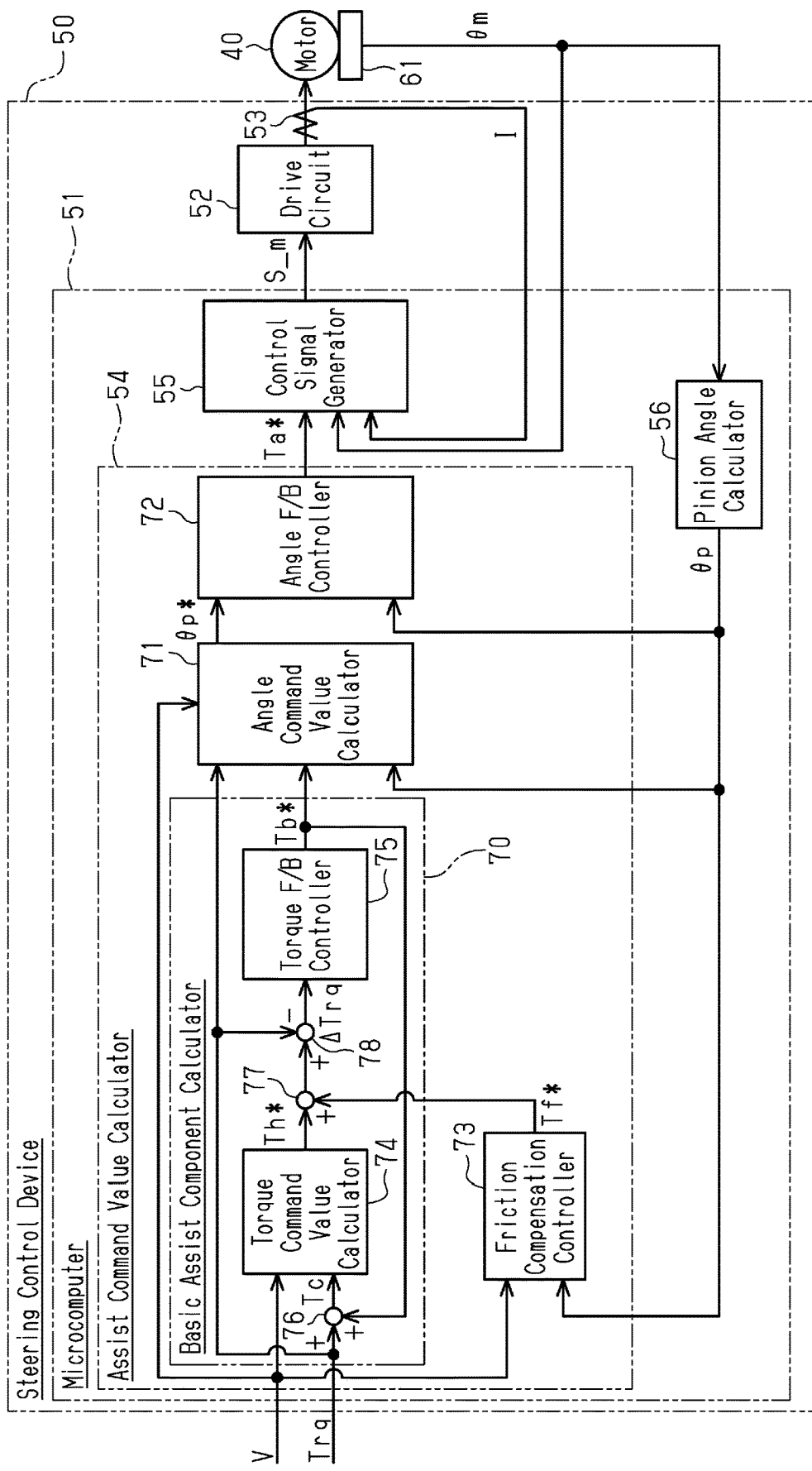
FIG. 2 is a block diagram showing the electric configuration of the electric power steering and the function of a microcomputer in the steering control device.

As shown in FIG. 2, the steering control device 50 includes a microcomputer 51 that generates a motor control signal S_m necessary for driving the motor 40 and a drive circuit 52 that supplies current to the motor 40 using the motor control signal S_m. The microcomputer 51 receives the detection results of the torque sensor 60, the rotation angle sensor 61, and the vehicle speed sensor 62 and receives an actual current I of the motor 40. The actual current I is detected by a current sensor 53. The current sensor 53 is arranged in a power feeding path, which is located between the drive circuit 52 and the motor 40. The microcomputer 51 generates the motor control signal S_m and outputs it to the drive circuit 52 as a PWM signal.

The function of the microcomputer 51 will now be described in detail. The microcomputer 51 includes a central processing unit (CPU) and a memory, which are not illustrated in the drawings. The driving of the motor 40 is controlled by the CPU executing programs stored in the memory.

The microcomputer 51 includes an assist command value calculator 54, a control signal generator 55, and a pinion angle calculator 56. The assist command value calculator 54 receives the vehicle speed value V, the steering torque Trq, and a pinion angle θp. In the present embodiment, the pinion angle θp is a rotation angle convertible into the steerable angle θt of each steerable wheel 15, and is calculated (generated) by the pinion angle calculator 56 using the rotation angle θm as the rotation angle of a part of the pinion shaft 11c closer to the steerable wheel 15 than the torque sensor 60. The pinion angle calculator 56 obtains the pinion angle θp by multiplying the rotation angle θm by a conversion coefficient. The conversion coefficient is set in correspondence with the deceleration ratio of the belt reduction drive 30 and the lead of the ball screw mechanism 20.

The assist command value calculator 54 uses the vehicle speed value V, the steering torque Trq, and the pinion angle θp to calculate an assist command value Ta*. The assist command value Ta* is the target value of a current amount corresponding to the assist force that should be generated by the motor 40.

The control signal generator 55 receives the assist command value Ta*, which has been calculated by the assist command value calculator 54, the rotation angle θm, and the actual current I. Using the rotation angle θm and the actual current I, the control signal generator 55 generates the motor control signal S_m by executing current feedback control such that the actual current I follows the assist command value Ta*, and outputs the signal to the drive circuit 52 as a PWM signal.

The function of the assist command value calculator 54 will now be described in more detail.

As shown in FIG. 2, the assist command value calculator 54 includes a basic assist component calculator 70 that calculates (generates) a basic assist component Tb*. The assist command value calculator 54 also includes an angle command value calculator 71 that calculates (generates) an angle command value θp*, an angle feedback controller (hereinafter referred to as angle F/B controller) 72 that calculates (generates) the assist command value Ta*, and a friction compensation controller 73 that calculates (generates) a friction component Tf*.

The basic assist component calculator 70 receives the vehicle speed value V, the steering torque Trq, and the friction component Tf*. The basic assist component calculator 70 includes a torque command value calculator 74 and a torque feedback controller (hereinafter referred to as torque F/B controller) 75. The torque command value calculator 74 functions to calculate and generate the basic assist component Tb*, which is a basic component of the assist command value Ta*, using the vehicle speed value V, the steering torque Trq, and the friction component Tf*.

More specifically, the torque command value calculator 74 receives the vehicle speed value V and a drive torque Tc, which is calculated using the steering torque Trq. The torque command value calculator 74 uses the drive torque Tc and the vehicle speed value V to calculate and generate a torque command value Th*, which is a target value of the steering torque Trq that should be input by the driver. In the present embodiment, the drive torque Tc is a total of the torque input to the steering mechanism 2 (steering shaft 11 and rack shaft 12), and is obtained by an addition processor 76 as an additional value of the steering torque Trq and the basic assist component Tb* (Tc=Trq+Tb*). As the absolute value of the drive torque Tc becomes larger and the vehicle speed value V becomes smaller, the torque command value calculator 74 calculates the torque command value Th* such that its absolute value becomes larger. The torque command value Th* is compensated by the addition processor 77 adding the friction component Tf*, which has been generated by the friction compensation controller 73, to the torque command value Th*.

The friction compensation controller 73 uses the vehicle speed value V and the pinion angle θp to calculate and generate the friction component Tf*, which is the friction (reaction force) for the torque input to the steering mechanism 2. To steer the steering wheel 10, the friction compensation controller 73 calculates the friction component Tf* such that its absolute value becomes larger as the absolute value of the pinion angle θp becomes larger, and calculates the friction component Tf* such that the absolute value of a change ratio of the friction component Tf* to the pinion angle θp becomes smaller. To return the steering wheel 10, the friction compensation controller 73 calculates the friction component Tf* such that its absolute value becomes larger in proportion to the absolute value of the pinion angle θp. The friction compensation controller 73 determines a change in the steering direction and determines whether the steering or returning is performed. Under these determinations, in order to give the driver a smooth steering feel, the friction compensation controller 73 calculates the friction component Tf* to apply a steering reaction force having a hysteresis characteristic suitable for steering by the driver. As the vehicle speed value V becomes larger, the friction compensation controller 73 calculates the friction component Tf* such that its absolute value becomes smaller.

When added by the addition processor 77, the friction component Tf* generated through the process of the friction compensation controller 73 is reflected on the torque command value Th* as a component of the steering torque Trq that should be input by the driver.

The torque F/B controller 75 receives a torque difference ΔTrq, which is calculated using the torque command value Th* subsequent to being compensated by the friction component Tf*. The torque F/B controller 75 uses the torque difference ΔTrq to calculate and generate the basic assist component Tb*. In the present embodiment, the torque difference ΔTrq is the difference of the steering torque Trq from the torque command value Th*, and is obtained as a subtraction value by a subtraction processor 78 subtracting the steering torque Trq from the torque command value Th* (ΔTrq=Th*−Trq). The torque F/B controller 75 uses the torque difference ΔTrq to calculate and generate the basic assist component Tb* by executing torque feedback control such that the steering torque Trq follows the torque command value Th*.

The angle command value calculator 71 receives the vehicle speed value V, the steering torque Trq, and the pinion angle θp in addition to the basic assist component Tb*, which has been generated by the basic assist component calculator 70. The angle command value calculator 71 includes a target model calculator 80. The target model calculator 80 functions to calculate and generate the angle command value θp*, which is a target value of the pinion angle θp, using the basic assist component Tb*, the vehicle speed value V, the steering torque Trq, and the pinion angle θp.

Figure 3:
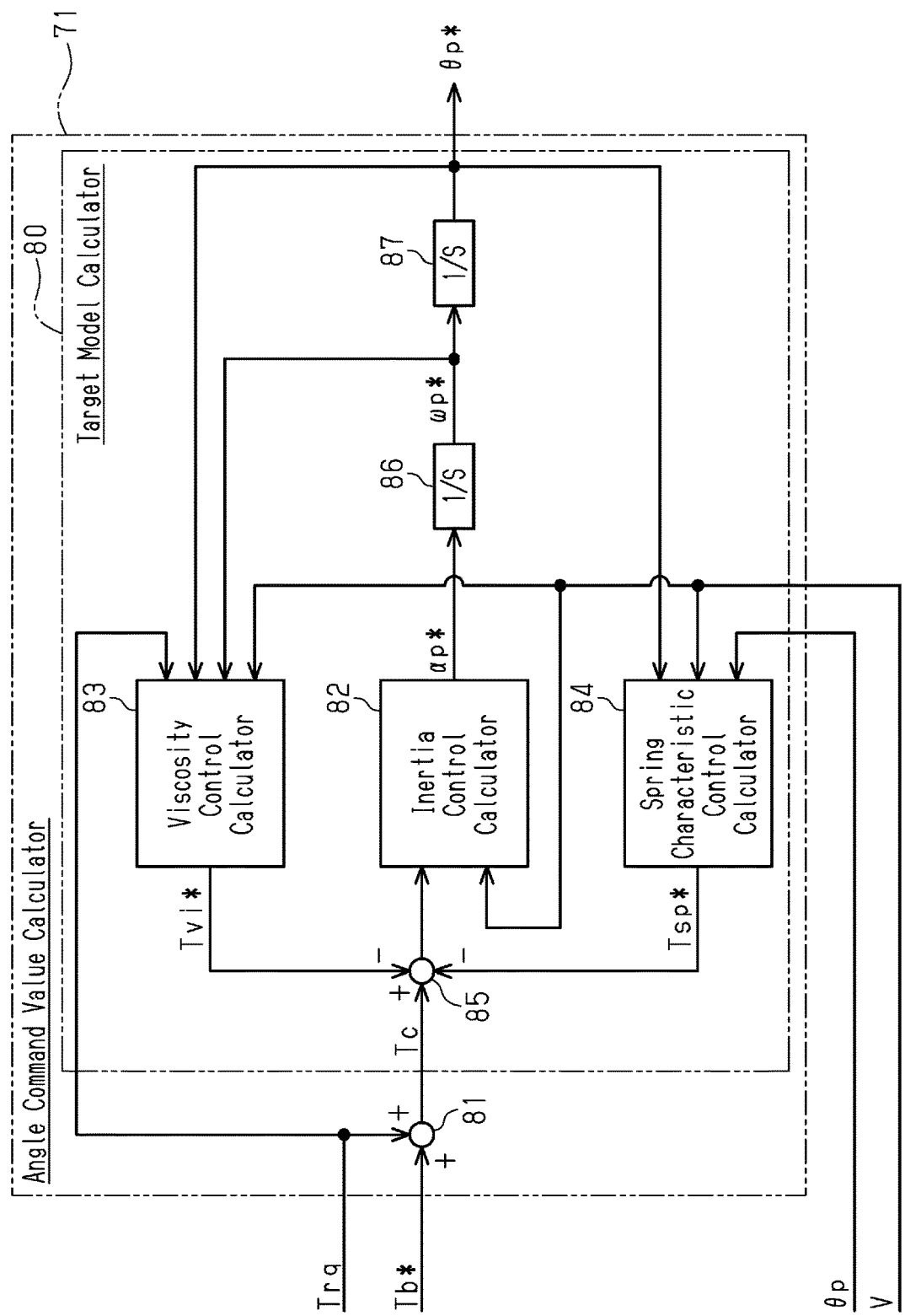
FIG. 3 is a block diagram showing the function of the angle command value calculator of the assist command value calculator in the microcomputer.

More specifically, as shown in FIG. 3, the target model calculator 80 receives the drive torque Tc, which is obtained by an addition processor 81 adding the basic assist component Tb* and the steering torque Trq (Tc=Trq+Tb*). The drive torque Tc is regarded as an input torque transmitted to the pinion shaft 11c. The target model calculator 80 uses the drive torque Tc to calculate the angle command value θp*.

Here, a model expression represented by the following expression (c1) that relates the drive torque Tc to the angle command value θp* is used.

$$Tc = K \cdot \theta p^* + C \cdot \theta p^{*\prime} + J \cdot \theta p^{*\prime\prime} \quad (c1)$$

The model represented by the above-described expression (c1) is an ideal model that defines the relationship between an input torque (drive torque) of the pinion shaft 11c, which rotates as the steering wheel 10 rotates, and the rotation angle (pinion angle) of the pinion shaft 11c. In the above-described expression (c1), a viscosity coefficient C is obtained by modelling the friction or the like of the electric power steering, an inertia coefficient J is obtained by modelling the inertia of the electric power steering, and a spring coefficient K is obtained by modelling the specification of, for example, the suspension or wheel alignment of a vehicle incorporating the electric power steering.

In the present embodiment, the target model calculator 80 includes an inertia control calculator 82 corresponding to an inertial term J·θp*″ of the above-described expression (c1), a viscosity control calculator 83 corresponding to a viscous term C·θp*′ of the above-described expression (c1), and a spring characteristic control calculator 84 corresponding to a spring term K·θp* of the above-described expression (c1). In the target model calculator 80, an inertial term obtained by a subtraction processor 85 subtracting, from the drive torque Tc, a viscosity component Tvi* generated by the viscosity control calculator 83 and a spring component Tsp* generated by the spring characteristic control calculator 84 is calculated and generated, and input to the inertia control calculator 82. The inertia control calculator 82 calculates and generates an angular acceleration command value αp* (second order time differential value (θp″) of angle command value θp*). The angular acceleration command value αp* is obtained by dividing the inertial term by the inertia coefficient J, which is set in correspondence with the vehicle speed value V.

Further, the target model calculator 80 calculates and generates an angular velocity command value ωp* (first order time differential value (θp′) of angle command value θp*). The angular velocity command value ωp* is obtained by an integration processor 86 integrating the angular acceleration command value αp*, which has been generated by the inertia control calculator 82. In addition, the target model calculator 80 calculates and generates the angle command value θp*. The angle command value θp* is obtained by an integration processor 87 integrating the angular velocity command value ωp*, which has been generated by the integration processor 86.

The viscosity control calculator 83 receives the vehicle speed value V and the steering torque Trq, in addition to the angular velocity command value ωp* and the angle command value θp*, which have been generated by the target model calculator 80. The viscosity control calculator 83 calculates and generates the viscosity component Tvi*. The viscosity component Tvi* includes a basic viscosity component Tvib*, which is obtained by multiplying the angular velocity command value ωp* by the viscosity coefficient C set in correspondence with the vehicle speed value V, and includes a damping compensation component Td* as a compensation component that compensates the basic viscosity component Tvib* so as to be optimized to the state of the vehicle or the steering mechanism 2. The damping compensation component Td* is a compensation component to make compensation so as to limit a sudden change (micro-vibration) in a steering angle θs (shown in FIG. 1), which is the rotation angle of the steering wheel 10. The detail of the calculation of the viscosity component Tvi* will be described later more specifically.

The spring characteristic control calculator 84 receives the vehicle speed value V and the pinion angle θp in addition to the angle command value θp*, which has been generated by the target model calculator 80. The spring characteristic control calculator 84 calculates and generates the spring component Tsp*. The spring component Tsp* is obtained by multiplying the angle command value θp* by the spring coefficient K, which is set in correspondence with the vehicle speed value V and the pinion angle θp. The spring component Tsp* is set so as to change the relationship between the spring coefficient K and the vehicle speed value V in correspondence with the pinion angle θp to cause the driver to input the torque necessary for steering the steerable wheel 15 with respect to the steerable angle θt. The spring component Tsp* has a tendency in which the absolute value of the spring component Tsp* is larger when the absolute value of the angle command value θp* is large than when the absolute value of the angle command value θp* is small.

Referring back to the description for FIG. 2, the angle F/B controller 72 receives the pinion angle θp in addition to the angle command value θp*, which has been generated by the angle command value calculator 71. The angle F/B controller 72 uses an angle difference Δθp to calculate and generate the assist command value Ta*. In the present embodiment, the angle difference Δθp is the difference of the pinion angle θp from the angle command value θp*, and can be obtained as a subtraction value that is obtained by subtracting the pinion angle θp from the angle command value θp* (Δθp=θp*−θp). The angle F/B controller 72 uses the angle difference Δθp to calculate and generate the assist command value Ta* by executing the angle feedback control such that the pinion angle θp follows the angle command value θp*. The assist command value Ta* generated by the angle F/B controller 72 is input to the control signal generator 55.

While controlling the driving of the motor 40, the microcomputer 51 having such a configuration repeatedly generates the basic assist component Tb* in a predetermined cycle to allow the driver to input a suitable steering torque Trq corresponding to the drive torque Tc through the process of the basic assist component calculator 70. Further, while controlling the driving of the motor 40, the microcomputer 51 repeatedly generates the angle command value θp* in the predetermined cycle to cause the angle command value θp* to change in correspondence with the basic assist component Tb* through the process of the angle command value calculator 71. In addition, in each predetermined cycle, the microcomputer 51 repeatedly executes a process of applying the assist force that maintains, at the suitable steering torque corresponding to the drive torque Tc, the steering torque Trq that should be input by the driver through the process of the angle F/B controller 72.

More specifically, the microcomputer 51 is configured to determine static characteristics of the electric power steering 1, which are the characteristics related to the steering torque Trq that should be input by the driver, through the process of the basic assist component calculator 70. Further, the microcomputer 51 is configured to determine dynamic characteristics (behavior of motion) of the electric power steering 1 (vehicle), which are the characteristics related to the steerable angle θt of the steerable wheel 15 operating so as to maintain the steering torque Trq that should be input by the driver at a suitable steering torque through the processes of the angle command value calculator 71 and the angle F/B controller 72. That is, the microcomputer 51 is configured to be able to independently adjust the static characteristics and the dynamic characteristics of the electric power steering 1.

The function of the viscosity control calculator 83 will now be described in more detail.

Figure 4:
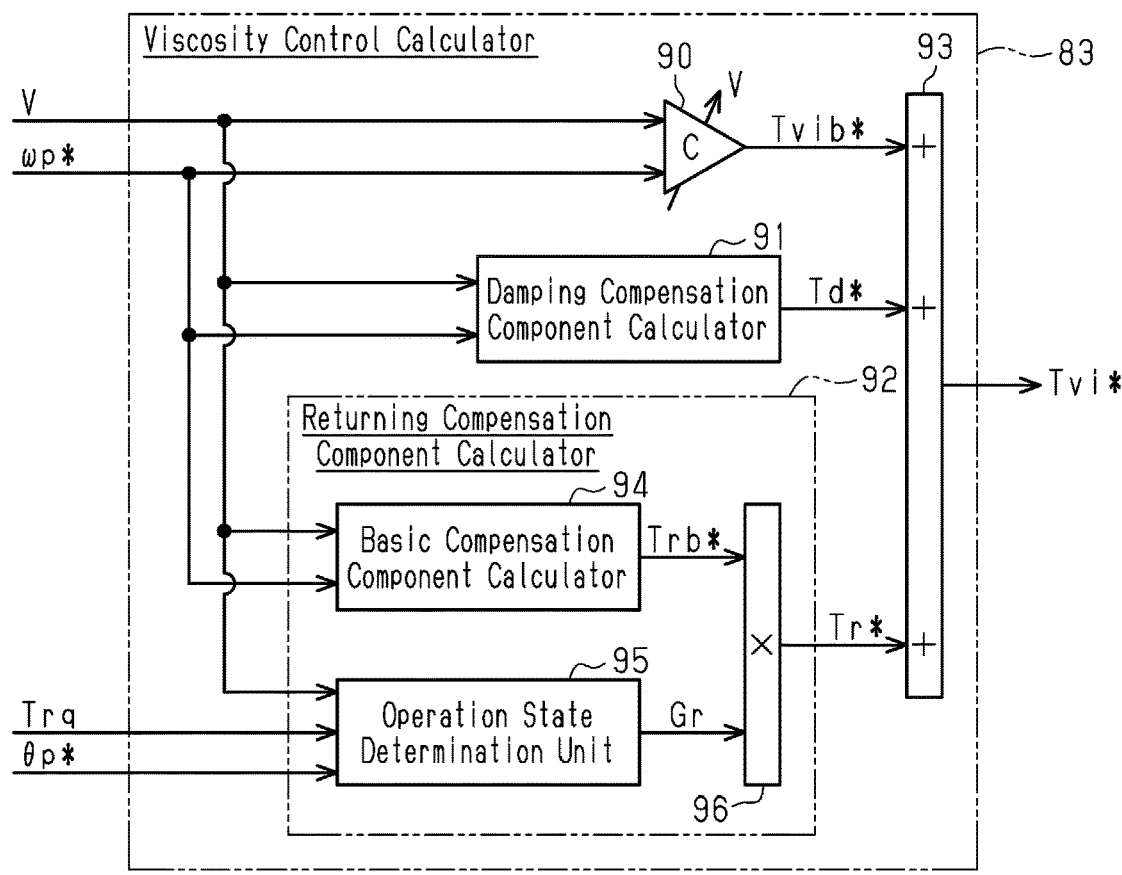
FIG. 4 is a block diagram showing the function of the viscosity control calculator in the angle command value calculator.

As shown in FIG. 4, the viscosity control calculator 83 includes a viscosity coefficient multiplier 90, a damping compensation component calculator 91, and a returning compensation component calculator 92. The calculators function to use the angular velocity command value ωp*, the angle command value θp*, the vehicle speed value V, and the steering torque Trq to calculate and generate the viscosity component Tvi*.

The viscosity coefficient multiplier 90 receives the vehicle speed value V and the angular velocity command value ωp*. The viscosity coefficient multiplier 90 calculates and generates the basic viscosity component Tvib* by multiplying the angular velocity command value ωp* by the viscosity coefficient C, which is set in correspondence with the vehicle speed value V.

The damping compensation component calculator 91 receives the vehicle speed value V and the angular velocity command value ωp*. The angle command value θp* correlates with the steering angle θs, which is the rotation angle of the steering wheel 10 (steering shaft 11), and is convertible into the steering angle θs. That is, the angular velocity command value ωp* correlates with a steering speed ωs, which is a change amount of the steering angle θs of the steering wheel 10, and can be used to calculate the steering speed ωs. The damping compensation component calculator 91 uses the vehicle speed value V and the angular velocity command value ωp* to calculate and generate the damping compensation component Td*. In correspondence with the absolute value of the angular velocity command value ωp*, the damping compensation component calculator 91 calculates the damping compensation component Td* set for the present vehicle speed value V. The damping compensation component Td* generated through the process of the damping compensation component calculator 91 is added to the basic viscosity component Tvib* in an addition processor 93 and reflected on the viscosity component Tvi* as a component acting in the direction opposite to a direction in which the present angular velocity command value ωp* occurs.

In addition to the vehicle speed value V and the angular velocity command value ωp*, the returning compensation component calculator 92 receives the steering torque Trq and the angle command value θp*. The returning compensation component calculator 92 uses the vehicle speed value V, the angular velocity command value ωp*, the steering torque Trq, and the angle command value θp* to calculate and generate, independently from the damping compensation component Td*, a returning compensation component Tr*. The returning compensation component Tr* is used to compensate the basic viscosity component Tvib* so as to limit the influence of the damping compensation component Td*, which is generated by the damping compensation component calculator 91.

In the present embodiment, the effect of the damping compensation component Td* functions when the steering wheel 10 will be returned to a neutral position by the action of self-aligning torque without the operation of returning by the driver after steering of the steering wheel 10. In this case, the effect of the damping compensation component Td* functions to limit a sudden change in the steering angle θs when the steering wheel 10 returns to the neutral position. As a result, the self-aligning torque is hampered. That is, the speed of the steering wheel 10 returning to the neutral position can become slow. For this reason, in the present embodiment, when the steering wheel 10 will return to the neutral position, the damping compensation component Td* and the returning compensation component Tr* are reflected on the angle command value θp* to limit the influence of the damping compensation component Td*, which is generated by the damping compensation component calculator 91.

More specifically, as shown in FIG. 4, the returning compensation component calculator 92 includes a basic compensation component calculator 94. The basic compensation component calculator 94 uses the vehicle speed value V and the angular velocity command value ωp* to calculate (generate) a basic returning compensation component Trb*, which is a basic component of the returning compensation component Tr*. In correspondence with the absolute value of the angular velocity command value ωp*, the basic compensation component calculator 94 calculates the basic returning compensation component Trb* set for the present vehicle speed value V. The basic returning compensation component Trb* is calculated as a component that acts in the direction opposite to a direction of the damping compensation component Td*, which is generated in correspondence with the present vehicle speed value V and angular velocity command value ωp*. In the present embodiment, the basic returning compensation component Trb* is set so as to counterbalance and cancel the damping compensation component Td*, which is generated in correspondence with the present vehicle speed value V and angular velocity command value ωp*, and the absolute value of the basic returning compensation component Trb* is equal to the damping compensation component Td*.

Further, the returning compensation component calculator 92 includes an operation state determination unit 95. The operation state determination unit 95 uses the vehicle speed value V, the steering torque Trq, and the angle command value θp* to determine whether the steering wheel 10 will return to the neutral position without the operation of returning by the driver after steering of the steering wheel 10. The operation state determination unit 95 determines whether the steering wheel 10 will return to the neutral position by determining that the steering torque Trq is smaller than the force necessary for returning the steering wheel 10 so as to steer the steerable wheel 15. In the vehicle, the force necessary for steering and returning the steering wheel 10 can be obtained empirically using the vehicle speed value V and the angle command value θp* (pinion angle θp).

Figure 5:
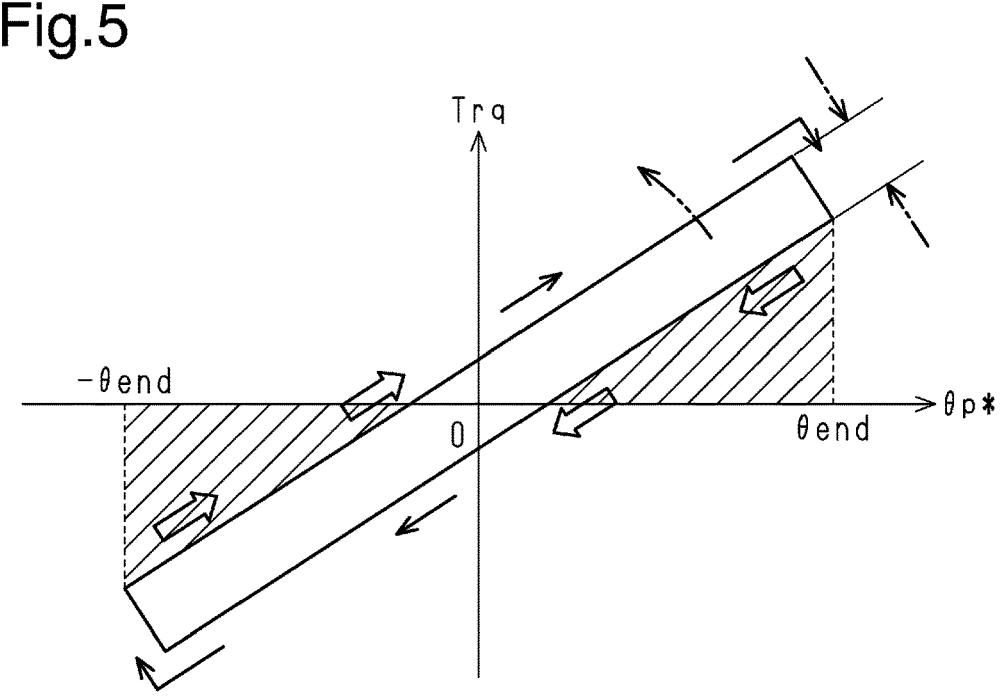
FIG. 5 is a graph illustrating a determination method executed by the operation state determination unit of the returning compensation component calculator in the viscosity control calculator.

For example, as shown in FIG. 5, the characteristics corresponding to the angle command value θp* (pinion angle θp) can be obtained for the force necessary for operating the steering wheel 10, with the angle command value θp* set to be positive when the steering wheel 10 is rotating in a predetermined direction and with the angle command value θp* set to be negative when the steering wheel 10 is rotating in the direction opposite to the predetermined direction. More specifically, as shown in FIG. 5, the characteristics of the force necessary for operating the steering wheel 10 have smaller values in the returning (blank arrows in FIG. 5) than in the steering (solid arrows in FIG. 5) with respect to the absolute value of the force. Further, the characteristics of the force necessary for operating the steering wheel 10 tend to increase in the steering (solid arrows in FIG. 5) and decrease in the returning (blank arrows in FIG. 5) between the maximum angles θend (+) and (−) from 0 (zero), which is the neutral position of the steering wheel 10, with respect to the absolute value of the force.

In FIG. 5, when the steering torque Trq (absolute value) falls below the force necessary for returning the steering wheel 10 in the hatched regions, it can be determined that the steering wheel 10 will return to the neutral position. Especially, in this case, in the range where the signs of the steering torque Trq and the angle command value θp* correspond to each other, it can be determined that the steering wheel 10 will be returned to the neutral position by the self-aligning torque. In the range where the reference numerals of the steering torque Trq and the angle command value θp* are different from each other, it can be determined that the self-aligning torque weakens or fails to function or that the operation by the driver is basically being performed during traveling of the vehicle.

In the present embodiment, it is assumed in the characteristics of the force necessary for operating the steering wheel 10 that the difference between the above-described steering and the above-described returning decreases with respect to the absolute value of the force in the case of a vehicle speed value V2 (shown by alternate long and short dashed lines in FIG. 5) as compared with the case of a vehicle speed value V1 (shown by solid lines in FIG. 5). Additionally, it is assumed in the characteristics of the force necessary for operating the steering wheel 10 that the gradient of the tendency of increase and decrease in the above-described steering and the above-described returning becomes larger with respect to the absolute value of the force in the case of a vehicle speed value V3 (shown by long dashed double-short dashed lines in FIG. 5) as compared with the case of the vehicle speed value V1 (shown by solid lines in FIG. 5).

In the range where the reference numerals of the steering torque Trq and the angle command value θp* correspond to each other, the operation state determination unit 95 determines that the steering wheel 10 will return to the neutral position when the steering torque Trq (absolute value) is smaller than the force necessary for returning the steering wheel 10. In this case, the operation state determination unit 95 executes calculation to set a returning compensation gain Gr to 1. Further, in the range where the reference numerals of the steering torque Trq and the angle command value θp* correspond to each other, the operation state determination unit 95 determines that the operation by the driver is performed (the steering wheel 10 will not return to the neutral position) when the steering torque Trq (absolute value) is not smaller than the force necessary for returning the steering wheel 10. In this case, the operation state determination unit 95 executes calculation to set the returning compensation gain Gr to 0 (zero). In the range where the reference numerals of the steering torque Trq and the angle command value θp* are different from each other, the operation state determination unit 95 executes calculation to set the returning compensation gain Gr to 0 regardless of the steering torque Trq.

The returning compensation component calculator 92 includes a multiplication processor 96. The multiplication processor 96 calculates (generates) the returning compensation component Tr*, which is obtained by multiplying, by the basic returning compensation component Trb* generated through the process of the basic compensation component calculator 94, the returning compensation gain Gr set through the process of the operation state determination unit 95.

On condition that the steering wheel 10 will return to the neutral position, the returning compensation component calculator 92 generates the basic returning compensation component Trb* as the returning compensation component Tr*, which functions to limit the influence of the damping compensation component Td*. By contrast, on condition that the steering wheel 10 will not return to the neutral position, the returning compensation component calculator 92 generates zero, regardless of the basic returning compensation component Trb*, as the returning compensation component Tr* functioning so as not to limit the influence of the damping compensation component Td*. The returning compensation component Tr* generated through the process of the returning compensation component calculator 92 is added to the basic viscosity component Tvib* in the addition processor 93 and reflected on the viscosity component Tvi* as a component acting in the direction opposite to the damping compensation component Td*.

While controlling the driving of the motor 40, the microcomputer 51 having such a configuration uses the vehicle speed value V, the angular velocity command value ωp*, the steering torque Trq, and the angle command value θp* to repeatedly generate the returning compensation component Tr* in the predetermined cycle in the returning compensation component calculator 92. That is, the microcomputer 51 makes compensation so as to limit a sudden change in the steering angle θs while controlling the driving of the motor 40, and repeatedly executes the process of limiting the influence of the damping compensation component Td* in the predetermined cycle when the steering wheel 10 will return to the neutral position.

The operation and advantages of the present embodiment will now be described.

(1) In the present embodiment, the basic assist component Tb* is calculated by executing the torque feedback control on the steering torque Trq that should be input by the driver to the torque command value Th*, which is calculated using the drive torque Tc input to the steering mechanism 2. The basic assist component Tb* calculated in this manner is used to calculate the angle command value θp*, and functions to change the angle command value θp* and vary the assist force in correspondence with that change. This causes the basic assist component Tb* to be applied to the steering mechanism 2 as the assist force acting such that the steering torque Trq that should be input by the driver is maintained at a suitable steering torque Trq corresponding to the drive torque Tc. That is, to optimize the steering characteristics indicated by the relationship between the steering torque Trq that should be input by the driver and the steerable angle θt (pinion angle θp) of the steerable wheel 15, which is the output of the electric power steering 1 (vehicle) to the steering torque Trq, the basic assist component Tb* only needs to be adjusted through the adjustment by the torque command value calculator 74 of the basic assist component calculator 70. Accordingly, in the adjustment to the optimal steering characteristics, the basic assist component Tb* simply needs to be adjusted. This facilitates the adjustment as compared with when adjustment needs to be made with other components.

(2) In an actual vehicle, the relationship between the input torque (drive torque) of the pinion shaft 11c, which rotates as the steering wheel 10 rotates, and the rotation angle (pinion angle) of the pinion shaft 11c may change depending on the state of the vehicle or the state of the steering mechanism 2. That is, when the angle command value θp* is calculated in reference to the actual state, a disturbance acting on the vehicle or the steering mechanism 2 of the vehicle is easily received.

In the present embodiment, in the angle command value calculator 71, the target model calculator 80 calculates the angle command value θp* using the above-described expression (c1), which represents an ideal model. Thus, even if a disturbance acts on the vehicle or the steering mechanism 2 of the vehicle, the angle command value θp* can be calculated under a limited influence of the disturbance. In this case, the steering control device 50 resists receiving the disturbance acting on the vehicle or the steering mechanism 2 of the vehicle and has an increased robustness for the disturbance. This limits fluctuations in the steering characteristics and increases the reproducibility of the optimized steering characteristics.

(3) In the present embodiment, the angle command value calculator 71 includes the compensation component calculators 91 and 92 that calculate the compensation components Td* and Tr*, which compensate the assist command value Ta* so as to be optimized to the state of the vehicle or the state of the steering mechanism 2 of the vehicle. This allows the angle command value calculator 71, which calculates the angle command value θp* taking the above-described expression (c1) into account, to jointly calculate the compensation components Td* and Tr*, which compensate for the dynamic characteristics related to the motion (behavior) of the vehicle or the steering mechanism 2 of the vehicle. That is, to optimize the dynamic characteristics, the compensation components Td* and Tr* simply need to be adjusted through the adjustment by the angle command value calculator 71. Accordingly, in the adjustment to the optimal dynamic characteristics, the compensation components Td* and Tr* of the angle command value calculator 71 simply need to be adjusted. This facilitates the adjustment as compared with when adjustment needs to be made with other components.

(4) In the present embodiment, when the steering wheel 10 will return to the neutral position without the operation of returning by the driver, the returning compensation component Tr* and the damping compensation component Td* are reflected on the angle command value θp*. This limits the influence of the damping compensation component Td*. Thus, regardless of whether the steering wheel 10 is steered or returned, the effect of the damping compensation component Td* functions when the driver intentionally operates the steering wheel 10 and does not function when the steering wheel 10 will return to the neutral position. That is, even if the steering wheel 10 will return to the neutral position, the hindrance of the self-aligning torque caused by the influence of the damping compensation component Td* is prevented so that the speed of the steering wheel 10 returning to the neutral position is prevented from becoming slow. This improves the steering feel and individually sets the adjustment of the speed of the steering wheel 10 returning to the neutral position. This also adjusts the speed of the steering wheel 10 returning to the neutral position while improving the steering feel.

(5) The steering wheel 10 may return to the neutral position regardless of whether the driver holds the steering wheel 10. For example, if the driver holds the steering wheel 10 but the holding force is sufficiently small, it is determined that the steering wheel 10 will return to the neutral position without the operation of returning by the driver.

In the present embodiment, the microcomputer 51 uses the steering torque Trq and the angle command value θp* to determine whether the steering wheel 10 will return to the neutral position. That is, even if the driver holds the steering wheel 10 when the steering wheel 10 will return to the neutral position, the hindrance of the self-aligning torque caused by the influence of the damping compensation component Td* is prevented so that the speed of the steering wheel 10 returning to the neutral position is prevented from becoming slow. Thus, the returning compensation component Tr* is applied properly. Accordingly, the problem in which the speed of the steering wheel 10 returning to the neutral position becomes slow can be handled properly.

(6) More specifically, when the steering torque Trq is smaller than the force necessary for returning the steering wheel 10 assumed in reference to the vehicle speed value V and the angle command value θp*, the microcomputer 51 determines that the steering wheel 10 will return to the neutral position. That is, even if the driver holds the steering wheel 10, it can be properly determined that the self-aligning torque will return the steering wheel 10 to the neutral position. Thus, the problem in which the speed of the steering wheel 10 returning to the neutral position becomes slow can be handled more properly.

(7) In the present embodiment, the friction component Tf* is reflected on the torque command value Th*. Thus, the basic assist component Tb* is applied to the steering mechanism 2 as the assist force acting so as to give the driver a smooth steering feel. That is, the friction (reaction force) on the torque input to the steering mechanism 2 can be managed, and the steering characteristics can be optimized in a favorable manner.

(8) In the present embodiment, the microcomputer 51 is configured to independently adjust the static characteristics and the dynamic characteristics of the electric power steering 1.

Figure 6:
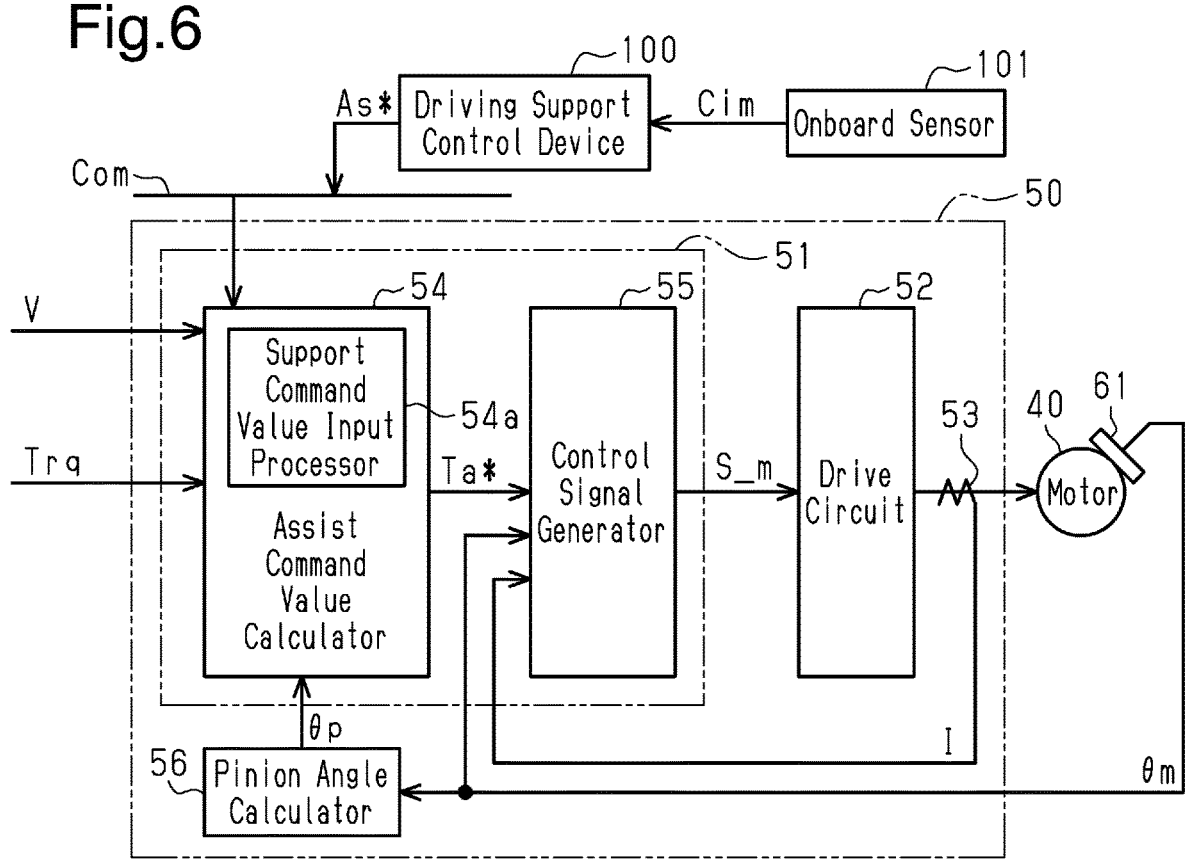
FIG. 6 is a block diagram showing the function of the microcomputer when the function of the steering control device is extended to a driving support device that supports driving by a driver.

For example, as shown in FIG. 6, the function of the electric power steering 1 may be extended to establish a driving support device that supports driving by the driver, such as an advanced driver assistance system (ADAS). In this case, the steering control device 50 is connected to a driving support control device 100 in a communicable manner, which is mounted on the vehicle via a communication line Com such as a controller area network (CAN) of an onboard network. The driving support control device 100 instructs the steering control device 50 to execute, for example, a driving support control allowing the vehicle to travel along a target road set such that the vehicle travels by maintaining a travel lane during the traveling. The driving support control device 100 uses vehicle information Cim, which is the detection result of an onboard sensor 101 such as an onboard camera or an onboard radar, to calculate and generate a target road used for the driving support control (direction of vehicle relative to road).

In this configuration, the driving support control device 100 outputs a driving support command value As* to the steering control device 50 as the information indicating the target road generated in reference to the detection result of the onboard sensor 101. Further, the driving support control device 100 executes, for the steering control device 50, a driving support control to provide a steering feel corresponding to the travel state of the vehicle. In this case, the driving support control device 100 uses the vehicle information Cim to calculate and generate a steering correction amount used for the driving support control (steering torque component used to adjust steering feel). Depending on the specification of the driving support control device 100, the driving support command value As* is output as a torque component or an angular component such as a steering torque component corresponding to the steering torque Trq, an angular component corresponding to the angle command value θp*, and an assist torque component corresponding to the assist command value Ta*. The microcomputer 51 uses the driving support command value As*, which is input from the outside of the steering control device 50, to execute the following processes as support command value input processes executed by a support command value input processor 54a.

Figure 7:
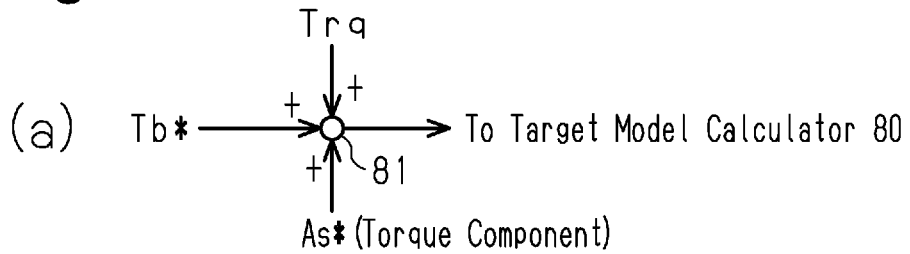
FIGS. 7A to 7D are block diagrams illustrating examples of concretization of the extension to the driving support device.
Figure 7:
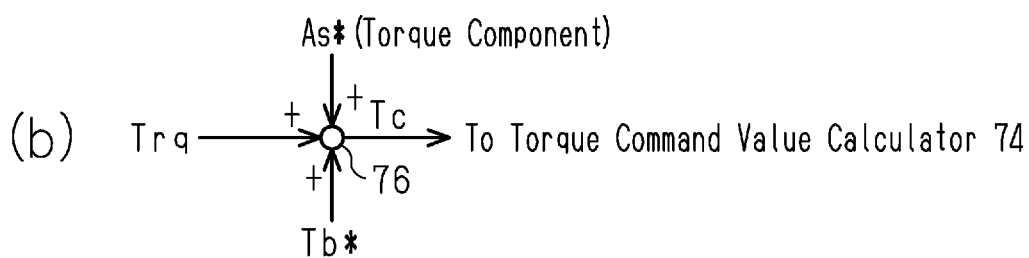
Figure 7:
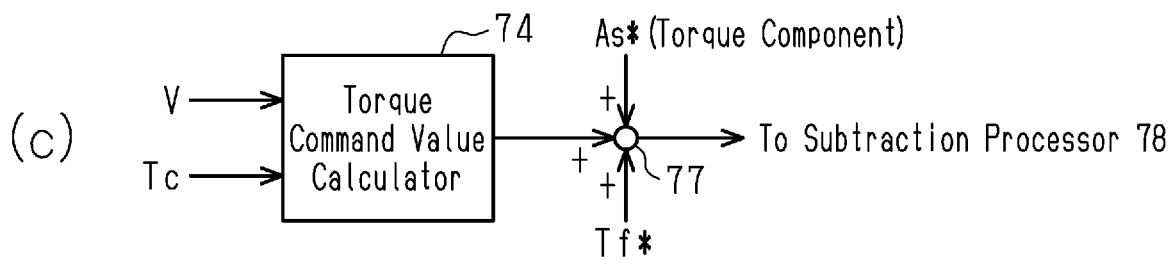
Figure 7:
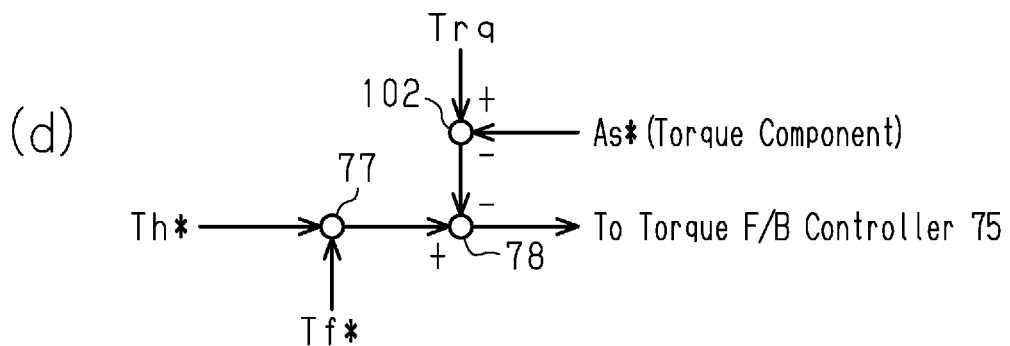

That is, as shown in FIG. 7A, in the microcomputer 51 of the present embodiment, when the driving support As* serving as a command value of the torque used to change the traveling direction of the vehicle is output from the driving support control device 100, the driving support command value As* may be added by the addition processor 81 of the angle command value calculator 71. This is equivalent to the addition of the driving support command value As* to the basic assist component Tb*, which has been generated by the torque F/B controller 75 of the assist command value calculator 54, as an input to the angle command value calculator 71 or the addition of the driving support command value As* to the steering torque Trq as an input to the angle command value calculator 71. In this case, the driving support command value As* is an operation amount with which the driving support control device 100 changes and controls the traveling direction of the vehicle by operating an axial force. This axial force is not a force that is to be actually added to the rack shaft 12 but an axial force that has been converted into the torque that is to be added to the steering shaft 11.

As shown in FIG. 7B, in the microcomputer 51 of the present embodiment, when the driving support As* serving as a command value of the torque used to change the traveling direction of the vehicle is output from the driving support control device 100, the driving support command value As* may be added by the addition processor 76 of the basic assist component calculator 70. This means that the driving support command value As* is added to the drive torque Tc as an input to the torque command value calculator 74. In this case, the driving support command value As* is an operation amount with which the driving support control device 100 changes and controls the traveling direction of the vehicle by hypothetically operating the input of torque to the steering wheel 10 by the driver.

As shown in FIG. 7C, in the microcomputer 51 of the present embodiment, when the driving support command value As* serving as the steering torque component is output from the driving support control device 100, the addition processor 77 simply needs to be modified so as to add the driving support command value As* to the torque command value Th* generated by the torque command value calculator 74 of the assist command value calculator 54. Here, the driving support command value As* is, for example, an adjustment amount used to adjust the size of the steering torque Trq input by the driver for steering feel adjustment. In this case, the driving support command value As* is positive when it is intended that the driver increases the steering torque Trq. Instead, an operation amount used to change the traveling direction of the vehicle may be employed.

As shown in FIG. 7D, in the microcomputer 51 of the present embodiment, when the driving support As* serving as the steering torque component is output from the driving support control device 100, a subtraction processor 102 simply needs to be supplemented to subtract the driving support command value As* from the steering torque Trq serving as an input to the subtraction processor 78. Here, the driving support command value As* is, for example, an adjustment amount used to adjust the size of the steering torque Trq input by the driver for steering feel adjustment. In this case, the driving support command value As* is positive when it is intended that the driver increases the steering torque Trq. Instead, an operation amount used to change the traveling direction of the vehicle may be employed.

Figure 8:
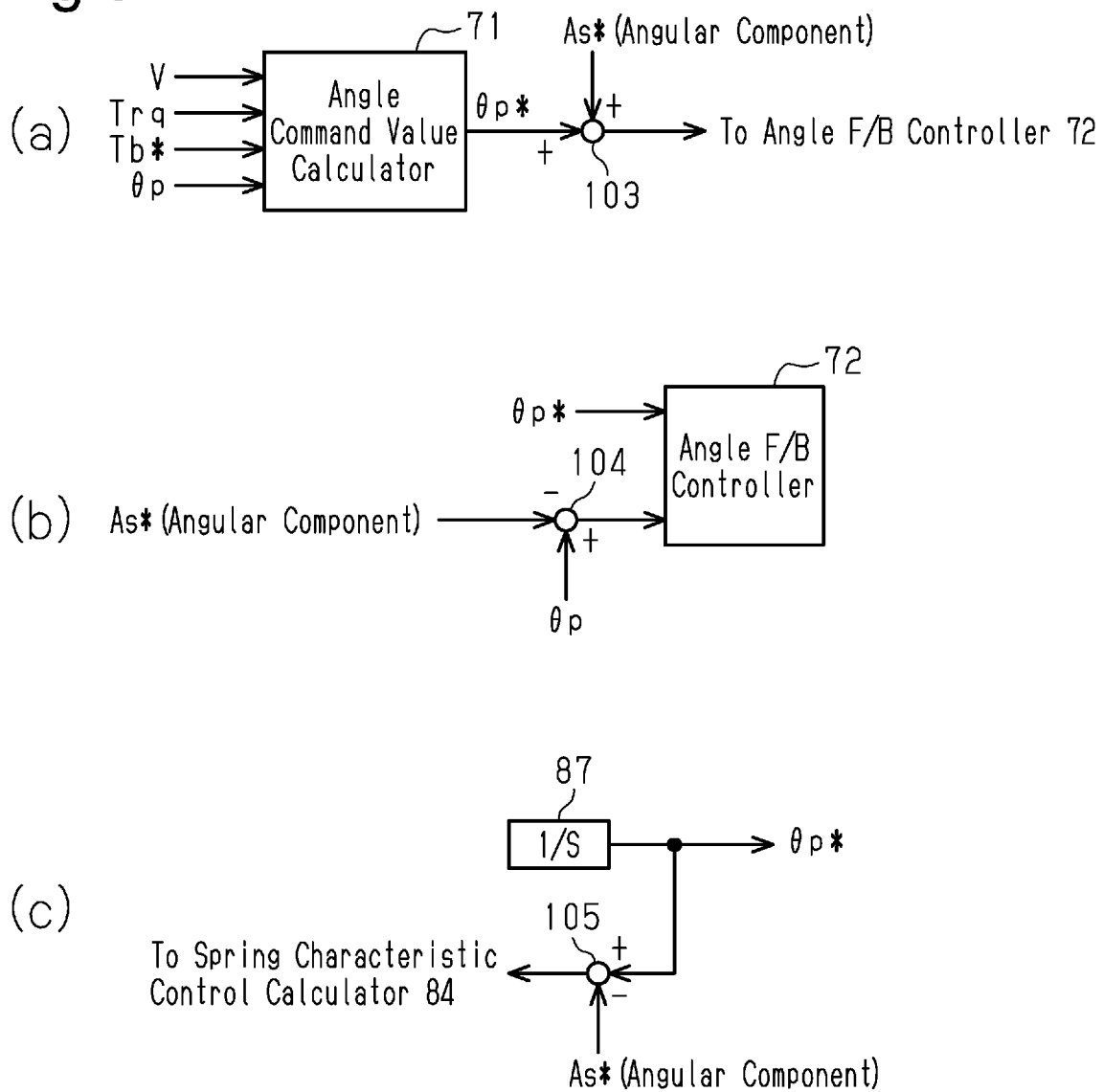
FIGS. 8A to 8C are block diagrams illustrating examples of concretization of the extension to the driving support device.

As shown in FIG. 8A, in the microcomputer 51 of the present embodiment, when the driving support command value As* serving as the angular component used to change the traveling direction of the vehicle is output from the driving support control device 100, an addition processor 103 simply needs to be supplemented to add the driving support command value As* to the angle command value θp* generated by the angle command value calculator 71 of the assist command value calculator 54. In this case, the driving support command value As* is a correction command value of the steerable angle (pinion angle θp). When it is intended that the pinion angle θp is corrected in a positive direction, the driving support command value As* is positive.

As shown in FIG. 8B, in the microcomputer 51 of the present embodiment, when the driving support As* serving as the angular component used to change the traveling direction of the vehicle is output from the driving support control device 100, a subtraction processor 104 may be supplemented to subtract the driving support command value As* from the pinion angle θp serving as an input to the angle FB controller 72. In this case, the driving support command value As* is a correction command value of the steerable angle (pinion angle θp). When it is intended that the pinion angle θp is corrected in a positive direction, the driving support command value As* is positive.

As shown in FIG. 8C, in the microcomputer 51 of the present embodiment, when the driving support As* serving as the angular component used to change the traveling direction of the vehicle is output from the driving support control device 100, a subtraction processor 105 may be supplemented to subtract the driving support command value As* from the angle command value θp* serving as an input parameter to the spring characteristic control calculator 84. In this case, the driving support command value As* is a correction command value of the steerable angle (pinion angle θp). When it is intended that the pinion angle θp is corrected in a positive direction, the driving support command value As* is positive.

Accordingly, in the steering control device 50 of the present embodiment, even if the driving support command value As* of any one of the above-described components is output when the function of the steering control device 50 is extended to the driving support device, the modification of the configuration in the functions of the microcomputer 51 is limited. As a result, the extension of the function of the steering control device 50 can be easily handled.

The correspondence between the items in the above-described embodiment and the items described in Means for Solving the Problem is as follows. In the following description, the correspondence is shown for each of the numbers in the solutions described in Means for Solving the Problem. The processing circuitry of item [1] corresponds to the microcomputer 51. Item [4] corresponds to FIG. 8A. Item [5] corresponds to FIG. 8B. Item [6] corresponds to FIG. 8C.

The above-described embodiment may be modified as follows.

The angle command value calculator 71 (target model calculator 80) does not have to include the compensation component calculators 91 and 92 or does not have to include the returning compensation component calculator 92, and may additionally include a compensation component that compensates for other dynamic characteristics. When the compensation component calculators 91 and 92 are not included, the corresponding compensation components may be generated with the generation of the basic assist component Tb*. The other compensation components may include, for example, a torque differentiation compensation component for making compensation so as to limit reverse input vibration that is transmitted from a road surface through the steerable wheel 15 to the steering shaft 11, and an inertia compensation component that limits a catching feeling at the time of starting steering and a flowing feel at the time of finishing steering. To generate the torque differentiation compensation component, a torque differential value obtained by differentiating the steering torque Trq simply needs to be used. To generate the inertia compensation component, the angular acceleration command value $\alpha p^*$ simply needs to be used.

Instead of the above-described expression (c1) representing an ideal model, the angle command value calculator 71 (target model calculator 80) may use, for example, the drive torque Tc as an input to execute map calculation of the angle command value $\theta p^*$.

Instead of the pinion angle $\theta p$, the spring characteristic control calculator 84 may, for example, detect an actual force of the rack shaft 12 or detect a yaw rate or lateral acceleration acting on the vehicle to change the relationship between the spring coefficient K and the vehicle speed value V in correspondence with the actual axial force or in correspondence with the yaw rate or lateral acceleration. That is, the characteristics of the torque necessary for steering the steerable wheel 15 relative to the steerable angle $\theta t$ may be changeable depending on, for example, the specification of the vehicle or the use environment.

In the target model calculator 80, in the inertia control calculator 82 or the viscosity control calculator 83, like the spring characteristic control calculator 84, the relationship of the vehicle speed value V with the inertia coefficient J or with the viscosity coefficient C may be changed in correspondence with the pinion angle $\theta p$. In this case, in the same manner as the foregoing, for example, the pinion angle $\theta p$ may be replaced with the actual axial force of the rack shaft 12 or replaced with the yaw rate or lateral acceleration acting on the vehicle.

When the assist command value calculator 54 will reflect, for example, a mechanical friction (reaction force) of the vehicle or the steering mechanism 2 of the vehicle on the steering torque Trq that should be input by the driver, the assist command value calculator 54 does not have to include the friction compensation controller 73. That is, the friction compensation controller 73 may be added, omitted, or changed depending on, for example, the specification of the vehicle or the use environment.

In the range where the reference numerals of the steering torque Trq and the angle command value $\theta p^*$ are different from each other, the operation state determination unit 95 may determine that the steering wheel 10 will return to the neutral position when the steering torque Trq (absolute value) is smaller than the force necessary for returning the steering wheel 10.

Regardless of the vehicle speed value V and the angle command value $\theta p^*$, the operation state determination unit 95 may determine that the steering wheel 10 will return to the neutral position when the steering torque Trq is zero. That is, the operation state determination unit 95 may determine that the steering wheel 10 will return to the neutral position using the steering torque Trq instead of using the vehicle speed value V and the angle command value $\theta p^*$.

The operation state determination unit 95 may determine using the angular velocity command value $\omega p^*$ whether the steering direction of the steering wheel 10 is oriented to the neutral position and then determine using the steering torque Trq and the angle command value $\theta p^*$ whether the steering wheel 10 will return to the neutral position. The operation state determination unit 95 simply needs to determine that the steering direction of the steering wheel 10 is oriented to the neutral position when the reference numerals of the angular velocity command value $\omega p^*$ and the angle command value $\theta p^*$ are different from each other.

In the operation state determination unit 95, many more types of characteristics of the force necessary for returning the steering wheel 10 to steer the steerable wheel 15 may be prepared as assumed characteristics.

The operation state determination unit 95 may set the value of the returning compensation gain Gr on a gradual basis between 0 (zero) and 1 in correspondence with the vehicle speed value V or the angle command value $\theta p^*$. The value of the returning compensation gain Gr simply needs to be set such that it becomes closer to 1 as the self-aligning torque becomes larger, that is, as the vehicle speed value V or the angle command value $\theta p^*$ becomes larger.

The returning compensation component calculator 92 simply needs to generate the returning compensation component Tr* so as to cancel the damping compensation component Td* even a little. For example, the basic returning compensation component Trb* may be set such that its absolute value becomes smaller than the damping compensation component Td* generated in reference to the present vehicle speed value V and angular velocity command value $\omega p^*$, or may be set such that the absolute value of the basic returning compensation component Trb* becomes smaller than or becomes equal to the damping compensation component Td* or becomes variable in correspondence with the present vehicle speed value V and angular velocity command value $\omega p^*$. In this case, the basic returning compensation component Trb* may be set so as to counterbalance and cancel the damping compensation component Td* generated in reference to the present vehicle speed value V and angular velocity command value $\omega p^*$, and the returning compensation gain Gr may be set to be less than or equal to 1 or may be varied between 0 (zero) and 1 in correspondence with the present vehicle speed value V and angular velocity command value $\omega p^*$.

The returning compensation component calculator 92 may calculate a gain by which the damping compensation component Td* is multiplied. In this case, the viscosity control calculator 83 simply needs to include a multiplication processor located between the damping compensation component calculator 91 and the addition processor 93 to calculate (generate) a damping compensation component Td'* subsequent to compensation by multiplying, by the damping compensation component Td*, the gain generated in the returning compensation component calculator 92. The same applies to the damping compensation component calculator 91. The damping compensation component calculator 91 may calculate a gain by which the basic viscosity component Tvib* is multiplied. If these configurations are both applied, instead of the addition processor 93, the viscosity control calculator 83 simply needs to include a multiplication processor that calculates (generates) the viscosity component Tvi* by multiplying, by the basic viscosity component Tvib*, the gain generated in the damping compensation component calculator 91 and the gain generated in the returning compensation component calculator 92.

The torque command value Th* may be adjusted in correspondence with desired steering characteristics. For example, the torque command value Th* may be calculated such that its absolute value becomes smaller as the vehicle speed value V becomes smaller. When calculating the torque command value Th*, the torque command value calculator 74 simply needs to use at least the drive torque Tc and does not have to use the vehicle speed value V. In addition, when calculating the torque command value Th*, the torque command value calculator 74 may use the drive torque Tc, the vehicle speed value V, and other elements. The same applies to the damping compensation component calculator 91 of the viscosity control calculator 83. When calculating the damping compensation component Td*, the damping compensation component calculator 91 simply needs to use the angular velocity command value $\omega p^*$, does not have to use the vehicle speed value V, or may use other elements in combination. In the returning compensation component calculator 92, the same applies to the basic compensation component calculator 94. When calculating the basic returning compensation component Trb*, the basic compensation component calculator 94 simply needs to use at least the angle command value $\theta p^*$, does not have to use the vehicle speed value V, or may use other elements in combination.

In the above-described embodiment, instead of the pinion angle $\theta p$, the steering angle $\theta s$ that changes as the steering wheel 10 rotates may be used as a rotation angle of the rotary shaft that is convertible into the steerable angle $\theta t$ of the steerable wheel 15. In this case, when a steering angle sensor that detects the steering angle $\theta s$ is mounted on the vehicle, the detection value of the steering angle sensor may be used instead of the rotation angle $\theta m$.

The configuration of facilitating the extension of the function of the steering control device to the driving support device does not have to include the torque F/B controller 75. For example, the basic assist component calculator 70 may be a process that calculates, using the steering torque Trq and the vehicle speed value V, the basic assist component Tb* without including a feedback process of torque. Even in this case, as illustrated in FIGS. 7A to 7D and FIGS. 8A to 8C, by inputting the driving support command value As* to the upstream side of the output of the angle F/B controller 72, the interference between the control by the angle F/B controller 72 and the driving support command value As* can be limited. This facilitates the extension to the driving support device.

In the above-described embodiment, the torque command value calculator 74 calculates the torque command value Th* for a target value of the steering torque that should be input by the driver to the drive torque Tc, which is the sum of the steering torque Trq and the basic assist component Tb*. However, the torque command value Th* does not have to be calculated using the drive torque Tc in this manner. Instead, for example, the torque command value Th* may be calculated for a weighted moving average process value of the yaw rate and the sum of the steering torque Trq and the basic assist component Tb* (drive torque Tc).

In the above-described embodiment, the subtraction processor 78 sets, as an input of the torque F/B controller 75, a subtraction value obtained by subtracting the steering torque Trq from the torque command value Th*. Instead, for example, a subtraction value obtained by subtracting the torque command value Th* from the steering torque Trq may be set as an input of the torque F/B controller 75. In this case, for example, when the torque F/B controller 75 includes a proportional element, a feedback gain can be set to be positive, for example, by setting a proportional gain to be positive.

In the above-described embodiment, the CPU executes programs stored in the memory to provide the assist command value calculator 54 and the pinion angle calculator 56. However, the microcomputer 51 does not have to execute software processing. For example, at least part of the processes executed by the software in the above-illustrated embodiment may be executed by hardware circuits dedicated to executing these processes (such as ASIC). That is, the steering control device may be modified as long as it has any one of the following configurations (a) to (c). (a) A configuration including a processor that executes all of the above-described processes according to programs and a program storage device such as a ROM that stores the programs. (b) A configuration including a processor and a program storage device that execute part of the above-described processes according to the programs and a dedicated hardware circuit that executes the remaining processes. (c) A configuration including a dedicated hardware circuit that executes all of the above-described processes. A plurality of software processing circuits each including a processor and a program storage device and a plurality of dedicated hardware circuits may be provided. That is, the above-described processes may be executed in any manner as long as the processes are executed by processing circuitry that includes at least one of a set of one or more software processing circuits and a set of one or more dedicated hardware circuits.

The above-described embodiment does not have to be applied to the electric power steering 1 of a rack assist type that applies an assist force to the steering mechanism 2 through the motor 40, of which the output shaft 40a is arranged in parallel to the axis of the rack shaft 12. Instead, for example, the above-described embodiment may be applied to an electric power steering of a column type or a pinion type.

The above-described modifications may be combined with one another. For example, the steering control device 50 to the column-type electric power steering may be applied, and the configurations of other modifications may be combined.

DESCRIPTION OF THE REFERENCE NUMERALS

Electric Power Steering; 2) Steering Mechanism; 10) Steerable Wheel; 11) Steering Shaft; 11a) Column Shaft; 11b) Intermediate Shaft; 11c) Pinion Shaft; 15) Steerable Wheel; 40) Motor; 40a) Output Shaft; 50) Steering Control Device; 51) Microcomputer; 54) Assist Command Value Calculator; 55) Control Signal Generator; 70) Basic Assist Component Calculator; 71) Angle Command Value Calculator; 72) Angle F/B Controller (Angle Feedback Controller); 74) Torque Command Value Calculator; 75) Torque F/B Controller (Torque Feedback Controller); 80) Target Model Calculator; 91) Damping Compensation Component Calculator; 92) Returning Compensation Component Calculator; $\theta m$) Rotation Angle; $\theta p$) Pinion Angle; $\theta t$) Steerable Angle; Tc) Drive Torque; $\theta p^*$) Angle Command Value; S_m) Motor Control Signal; Ta*) Assist Command Value; Tb*) Basic Assist Component; Td*) Damping Compensation Component; Th*) Torque Command Value; Tr*) Returning Compensation Component; Trq) Steering Torque

The invention claimed is:

1. A steering control device comprising:
processing circuitry configured to execute:
a process that controls driving of a motor using an input from outside to operate a steering mechanism such that a steerable wheel of a vehicle steers the vehicle, the motor being a generation source of force applied to the steering mechanism, the input including a steering torque that is input by a driver and a driving support command value that supports driving by the driver, the driving support command value being input by a driving support control device, the driving support command value indicating a target road;

an angle command value calculation process that calculates, using the inputted steering torque, an angle command value corresponding to a target value of a rotation angle of a rotary shaft convertible into a steerable angle of the steerable wheel;

an angle feedback control process that calculates an operation amount to execute a feedback control for the rotation angle so that the rotation angle follows the calculated angle command value, the operation amount being based on the inputted driving support command value;

a support command value input process that inputs the inputted driving support command value to an upstream side of the angle feedback control process; and a control signal generation process that generates, using the calculated operation amount, a motor control signal that drives the motor.

2. The steering control device according to claim 1, wherein
the operation amount includes a dimension of torque, and the driving support command value includes a dimension of torque.

3. The steering control device according to claim 2, wherein:
the processing circuitry executes a torque control process including:
a torque feedback control process that calculates a feedback torque component corresponding to an operation amount used to execute a feedback control for the steering torque so that the steering torque follows a torque command value corresponding to a target value of the steering torque to be input by the driver, and
a torque command value calculation process that calculates the torque command value using a sum of the feedback torque component and the steering torque, and a value corresponding to the feedback torque component is output as an input to the angle command value calculation process, and
the support command value process sets the driving support command value as an input to the torque control process.

4. The steering control device according to claim 1, wherein:
the driving support command value is a command value of an angle used to change a traveling direction of the vehicle, and
the support command value input process adds the driving support command value to an output from the angle command value calculation process serving as an input to the angle feedback control process.

5. The steering control device according to claim 1, wherein:
the driving support command value is a command value of an angle used to change a traveling direction of the vehicle, and
the support command value input process subtracts the driving support command value from the rotation angle serving as an input to the angle feedback control process.

6. The steering control device according to claim 1, wherein:
the angle command value calculation process includes:
a spring characteristic control calculation process that calculates, using the angle command value, a spring component having an absolute value that is larger when an absolute value of the angle command value is large as compared to when the absolute value of the angle command value is small, the spring component being an amount that resists a force of the motor that steers the steerable wheel, and
a process that calculates the angle command value using a value obtained by subtracting the spring component from the input to the angle command value calculation process,
the driving support command value is a command value of an angle used to change a traveling direction of the vehicle, and
the support command value input process subtracts the driving support command value from the angle command value serving as an input parameter to the spring characteristic control calculation process.

* * * * *